United States Patent [19]

Freid

[11] 4,245,787
[45] Jan. 20, 1981

[54] VARIABLE AREA NOZZLE SYSTEM

[75] Inventor: Wilbert B. Freid, Swampscott, Mass.

[73] Assignee: General Electric Company, Lynn, Mass.

[21] Appl. No.: 965,643

[22] Filed: Dec. 1, 1978

[51] Int. Cl.² .................................................. B64C 15/06
[52] U.S. Cl. ................................................. 239/265.41
[58] Field of Search ........................ 239/265.39, 265.41

[56] References Cited

U.S. PATENT DOCUMENTS

| 2,794,317 | 6/1957 | Brown | 239/265.39 |
| 2,926,491 | 3/1960 | Hyde | 239/265.41 |
| 2,927,424 | 3/1960 | Hyde | 239/265.39 |
| 2,999,354 | 9/1961 | Gallo et al. | 239/265.41 X |
| 3,025,666 | 3/1962 | Keen | 239/265.41 X |
| 4,000,855 | 1/1977 | Anders et al. | 239/265.39 |

Primary Examiner—Richard A. Schacher
Attorney, Agent, or Firm—Henry J. Policinski; Derek P. Lawrence

[57] ABSTRACT

A variable area nozzle system for a gas turbine engine is provided which includes actuating means for opening and closing of the nozzle. The actuating means are adapted to operatively engage a convergent flap for rotating the flap in a first direction of rotation to close the nozzle. The actuating means are further adapted to engage a compression link for rotating the link in a second direction of rotation to open the nozzle.

4 Claims, 5 Drawing Figures

4,245,787

VARIABLE AREA NOZZLE SYSTEM

BACKGROUND OF THE INVENTION

This invention relates to a gas turbine engine and more specifically to a variable area exhaust nozzle system associated with a gas turbine engine.

The Government has rights to this invention pursuant to Contract No. N00019-76-C-0261 awarded by the Department of the Navy.

Many present day military aircraft must have the capability of accomplishing a number of missions and therefore the power plant, typically a gas turbine engine, is required to exhibit high performance characteristics over the entire range of possible operating conditions. In some instances it has become a necessity for this type of engine to include a convergent/divergent exhaust nozzle having a variable area both at the throat (at the downstream end of the convergent nozzle) and at the nozzle exit (at the downstream end of the divergent nozzle).

Variable area nozzles are well known in the art. Some prior art nozzles have an area ratio which is fixed by making the convergent nozzle integral and not movable in relation to the divergent section. Another approach makes movement of the convergent nozzle entirely independent from movement of the divergent nozzle and further providing for separate actuation of each nozzle. The first approach proved to have limited flexibility in optimizing the nozzle area ratio schedule for initial cycle requirements and in accommodating changes in cycle and mission requirements. The latter approach presented penalties in the way of complexity, weight and cost due primarily to the presence of dual actuators.

In an attempt to provide a variable nozzle offering to improve characteristics over these prior art approaches, the structure shown in U.S. patent application Ser. No. 814,568, filed on July 11, 1977, in the name of Arthur McCardle, Jr., and assigned to the same assignee as is this present invention was originated. Generally, this structure presented a variable area nozzle in which the convergent flap and divergent flap were pivotally linked together. Additionally, a single actuator was provided for closing the nozzle under appropriate operating requirements by a cam/follower arrangement associated with the convergent flap. The actuator closed the convergent flap which, in turn, closed the divergent flap due to the pivotal connection between the divergent flap and the convergent flap. However, the actuator was not used to open either nozzle but rather the pressure of the gases flowing through the nozzle was relied upon to provide appropriate force to open the convergent nozzle and the attached divergent nozzle.

The device presented in the above mentioned reference has generally worked satisfactorily and has proved to be a significant advancement in the state of the art. However, under certain transient conditions such as rapid deceleration to an idle condition the nozzle is required to double its area in a very short time approximating 1.2 seconds. Under these circumstances it has been found that the pressure of the gases flowing through the nozzle is not sufficient to open the nozzle. Since underside hooks or rollers were provided to engage the convergent flap for preventing the cam from disengaging the cam follower, the connection between convergent flap and the rollers results in the convergent flap being rapidly pulled open by the actuator via the underside arrangement. This results in damage to the underside hooks since the forces encountered in this action are greater than those forces capable of being withstood by the underside hooks or rollers. The present invention addresses this problem associated with this prior art variable nozzle.

It is therefore an object of the present invention to provide a variable area exhaust nozzle which is suitable for multi-mission aircraft application.

It is another object of the present invention to provide an improved variable exhaust nozzle of the type described in the aforementioned patent application.

It is yet another object of the present invention to provide a variable area exhaust nozzle which provides means for rapidly opening the nozzle in the event the pressure of the gases flowing through the nozzle are insufficient to accomplish this objective in the required time.

SUMMARY OF THE INVENTION

Briefly stated, these and other objects, which will become apparent from a reading of the following description of the preferred embodiment in conjunction with the appended drawings, are accomplished by the present invention in which a variable area exhaust nozzle system is provided which includes a convergent flap pivotally connected to the engine and a divergent flap connected to the convergent flap. A rotatable compression link is pivotally connected to the engine and to the divergent flap. The system further includes an outer flap pivotally attached, at its upstream end, to the engine and, at its downstream end, to the divergent flap. Actuating means are provided for opening and closing the nozzle and are adapted to operatively engage the convergent flap for rotating the convergent flap in a first direction of rotation and are further adapted to operatively engage the compression link for rotating the link in a second direction of rotation. The actuating means may comprise an actuating ring, first cam roller, a first cam follower, a second cam roller and a second cam follower.

BRIEF DESCRIPTION OF THE DRAWINGS

The present invention will be readily understood by a reading of the following description of the preferred embodiment with reference to the appended drawings in which.

DESCRIPTION OF THE PREFERRED EMBODIMENT

Figure 1:
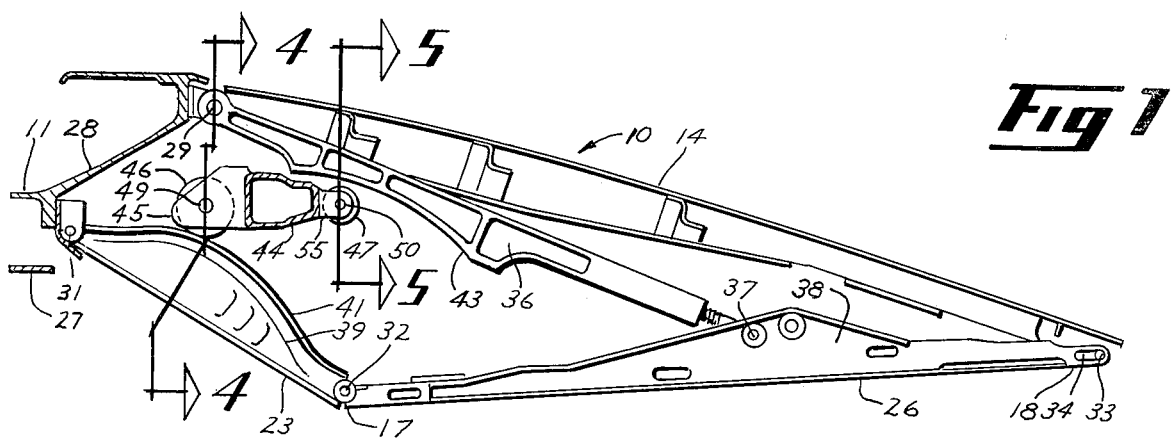
FIG. 1 is a cross-sectional view of a nozzle flap in accordance with the present invention disposed in a closed position (small throat area).
Figure 2:
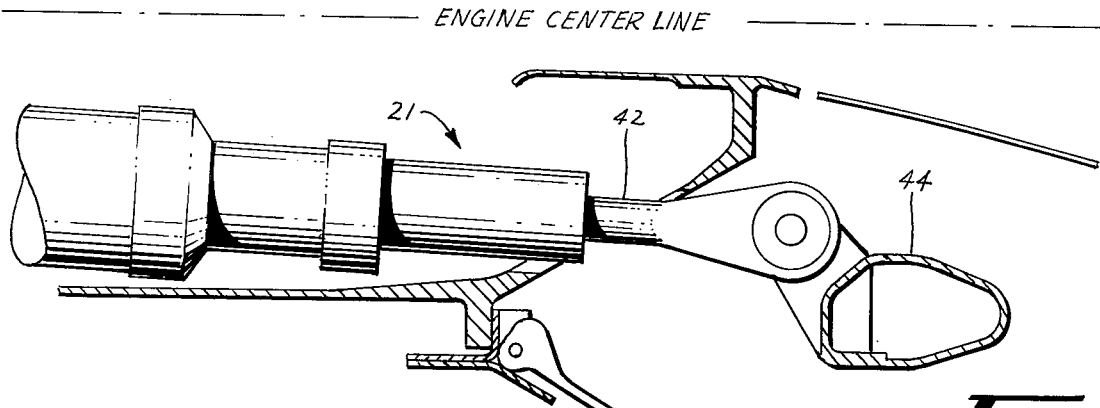
FIG. 2 is a cross-sectional view of the nozzle flap shown in FIG. 1 but taken at a circumferential location so as to depict the nozzle actuating mechanism.
Figure 3:
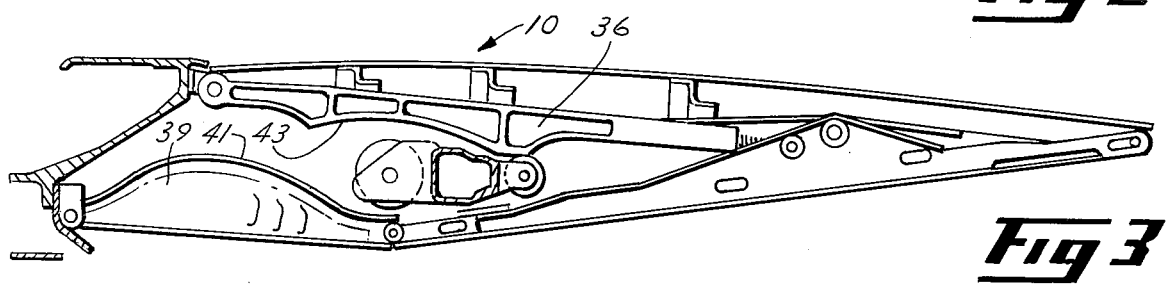
FIG. 3 is a cross-sectional view of the nozzle flap shown in FIG. 1 disposed in an open position.

Referring now to FIGS. 1 and 2, the nozzle flap comprising the present invention is shown generally at 10 and is attached to an engine exhaust duct 11. For a general understanding of how the individual flaps and seals interrelate and cooperate to form the overall nozzle function, reference may be made to the patent application entitled, "Exhaust Nozzle Flap Seal Arrangement," Edward W. Ryan, et al, filed July 11, 1977, and assigned to the same assignee. Briefly, the exhaust nozzle assembly includes a plurality of circumferentially spaced nozzle flaps 10 (only one of which is shown in FIG. 1) hinged at the downstream end of the exhaust duct 11 to define a symmetrical inner nozzle area, which is variable at both the throat 17 and the exit point 18. The nozzle areas are varied by way of actuators 21 which are designed to selectively modulate the nozzle flaps 10 between the fully closed position as shown in FIG. 1 and the fully open position as shown in FIG. 3. Leakage of exhaust gases between the flaps 10 is prevented by convergent seals (not shown) associated with convergent flaps 23, divergent seals (not shown) associated with the divergent flaps 26, and outer seals (not shown) which are associated with outer flaps 14.

The exhaust duct 11 which carries exhaust gases from the fan and turbine (or only the turbine if there is no fan) includes an exhaust duct liner 27 for cooling the duct walls as is well known in the art. Projecting rearwardly and outwardly from the exhaust duct structure 11 is a rigid link or ring structure 28 which may be integrally attached with the exhaust duct 11 or attached to it by way of welding or the like. Attached to the ring structure 28, at circumferentially spaced positions, are a plurality of outer and inner pivots 29 and 31, respectively. Each pair of outer and inner pivots is adapted to operably receive and mechanically secure the movable elements of flap 10 to the engine.

Nozzle flap 10 is comprised, then, of a four-bar linkage having a fixed ring or link 28 and three movable links, namely, convergent flap 23, divergent flap 26 and compression link 36. At the outer pivot 29, the forward end of the outer flap 14 is rotatably secured by way of suitable means such as a bolt or the like. At the inner pivot 31, the forward end of the convergent flap 23 is pivotably secured. Other connections within the nozzle flap itself include the throat joint 32 comprising the pivotal connection between the downstream end of the convergent flaps 23 and the upstream end of the divergent flaps 26, and an exit joint 33 between the downstream end of the divergent flaps 26, and the downstream end of the outer flaps 14. The exit joint 33 includes an elongated slot 34 which allows for translatable relative movement as well as rotational movement between the connected parts. Another linking structure in the flap arrangement is that of the compression link 36 which is attached to the engine at its one end at outer pivot 29 and attached at its other end to a compression pivot 37 which is located at an intermediate point on the outer structure 38 of the divergent flap 26. The compression link 36 acts to control the movement of the divergent flap 26 and the outer flap 14 in a desired manner as will be described hereinafter.

As will be seen by reference to FIGS. 1 and 3, the outer structure 39 of the convergent flap 23 is reinforced and curved to form a convex cam follower surface 41. By selective movement of a force-exerting element on this cam follower surface, the flaps are concurrently caused to move radially inwardly so as to decrease the exhaust area of the nozzle 10 at the throat 17 and the exit 18. Additionally, compression link 36 is provided with a cam follower surface 43 thereon which cooperates with a force exerting element to open flap 10 in a manner to be described.

Referring to FIGS. 1 and 2, the actuation means in the form of actuator 21 includes a hydraulic piston 42 pivotally attached to a single actuator ring 44 in a manner well known in the art. Generally, actuator means 21 further includes a first cam roller 46 associated with ring 44 and a first cam follower surface 41 disposed on structure 39 of flap 23. In this manner, then, direct operative engagement is provided between actuator means 21 and convergent flap 23 for rotating convergent flap 23 in a first direction of rotation. Movement of the hydraulic piston 42 in the forward direction (to the left in FIGS. 1, 2 and 3) moves the actuator ring 44 in the forward direction. As the ring 44 is translated forward, roller 46 pushes cam follower surface 41 and its associated convergent flap 23 in rotation about pivot 31 in a first direction of rotation causing flap 23 to move radially inwardly to effect closure of nozzle 10.

Actuator means further includes a second cam roller 47 associated with ring 44 and a second cam follower surface 43 disposed on compression link 36. Hence, direct operative engagement is provided between actuator means 21 and compression link 36 for rotating link 36 in a second direction of rotation. Movement of hydraulic piston 42 in the aft direction (to the right in FIGS. 1, 2, and 3) moves actuator ring 44 in the aft direction. As ring 44 is translated aft, roller 47 pushes cam follower surface 43 and its associated compression link 36 in rotation about pivot 29 in a second direction of rotation causing link 36 to move radially outwardly. Movement of compression link, in this manner, effects opening of nozzle 10.

Figure 4:
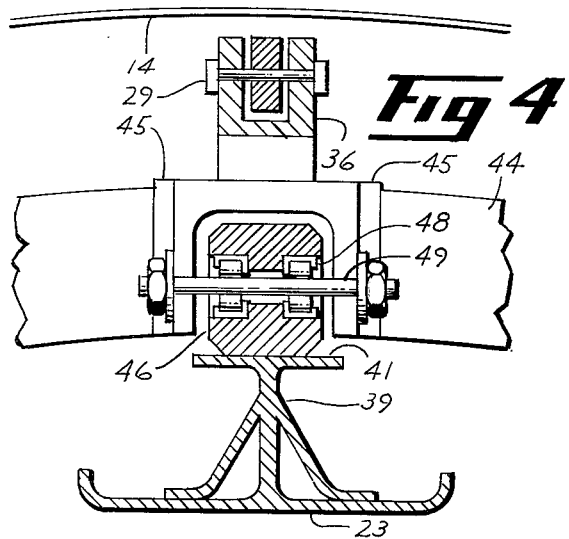
FIG. 4 is a cross-sectional view of the nozzle flap taken along the line 4—4 of FIG. 1.
Figure 5:
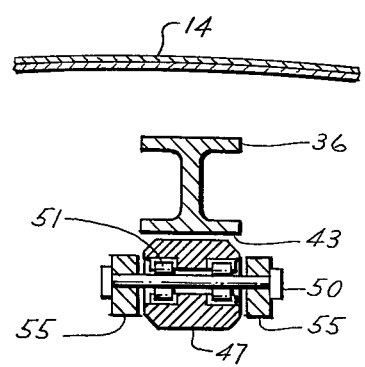
FIG. 5 is a cross-sectional view of the nozzle flap taken along the line 5—5 of FIG. 1.

Referring now to FIGS. 4 and 5, the cam rollers 46 and 47 are shown in more detail respectively. Ring 44 includes a first pair of fixedly secured spaced apart flanges 45 between which is mounted cam roller 46 on shaft 49 by a plurality of roller bearings 48. The cam roller 46 rides on the cam follower surface 41 of the convergent section outer structure 39. Similarly, ring 44 includes a second pair of spaced apart flanges 55 fixedly secured to ring 44. Cam roller 47 is mounted between flanges 55 for rotation about shaft 50 upon a plurality of roller bearings 51. It should be stated that, in order to avoid binding of the nozzle 10, the cam rollers 46 and 47 are never simultaneously in contact with their respective followers 41 and 43. Rather a slight clearance is maintained, by way of example, between roller 47 and follower 43 when roller 46 engages follower 41. Similarly, a clearance is maintained between roller 46 and follower surface 41 when roller 47 engages follower 43.

In operation, when the actuator piston 42 is in the retracted or forward position, the actuator ring 44 is in the position as shown in FIG. 1. In this position, the exhaust nozzle flaps are in the fully closed position, and the nozzle throat area (A8) and exit area (A9), associated with points 17 and 18, respectively, are at or near a minimum. As can be seen, the throat area A8 is smaller than that of the exit area A9 to present a diverging nozzle configuration. The throat area A8 is smaller than the liner exit area to present a converging nozzle configuration. It will be understood that for particular engine cycle requirements, this configuration may be different.

As the hydraulic piston is extended rearwardly, the actuator ring 44 is translated rearwardly and the roller 47 moves rearwardly on the cam follower surface 43 of compression link 36. This action pushes compression link 36 in rotation about pivot 29 in a second or counterclockwise direction. Movement of link 36 in this manner causes nozzle 10 to open. The final position of nozzle 10 and hence the final position of the throat joint 32, joint 37, divergent flap 26 and the outer flap 14 will depend on the characteristics of the 4 bar linkage system as primarily determined by the compression link 36. Closure of nozzle 10 is effected by movement of ring 44 in the forward direction whereby roller 46 moves forward on cam follower surface 41. This action pushes convergent flap 23 in rotation about pivot 31 in a first or clockwise direction of rotation to close nozzle 10.

It will be understood that while the present invention has been described in terms of the preferred embodiment, it may take on any number of other forms while remaining within the scope and intent of the invention.

Having thus described what is considered novel and desired to be secured by Letters Patent of the United States is:

1. A variable area nozzle system for a gas turbine engine comprising in combination:
   a convergent flap pivotally connected to said engine;
   a divergent flap pivotally connected to said convergent flap;
   a rotatable compression link pivotally connected to said engine and to said divergent flap;
   an outer flap pivotally attached at its upstream end to said engine and at its downstream end to said divergent flap; and
   an actuator adapted to selectively modulate said variable area nozzle between a fully closed position and a fully open position, said actuator adapted to operatively engage said convergent flap for rotating said convergent flap in a first direction of rotation, said actuator further adapted to operatively engage said compression link for rotating said compression link in a second direction of rotation.

2. The invention as set forth in claim 1 wherein said actuator comprises:
   an actuating ring adapted for translational movement in the forward and aft direction in response to movement of said actuator;
   a first cam roller and cam follower associated with said ring and said convergent flap said convergent flap rotatable in said first direction of rotation by said roller and follower in response to movement of said ring in one of said forward and aft directions; and
   a second cam roller and cam follower associated with said ring and said compression link said compression link rotatable in said second direction of rotation by said second roller and follower in response to movement of said ring in the other of said forward and aft directions.

3. The invention as set forth in claim 2 wherein said first cam follower is disposed on said convergent flap and said first cam roller engages said first cam follower.

4. The invention as set forth in claim 3 wherein said second cam follower is disposed on said compression link and said second cam roller engages said second cam follower.

* * * * *